F. N. MARTIN.
Gun-Sight Cover.
No. 41,162
Patented Jan. 5, 1864.
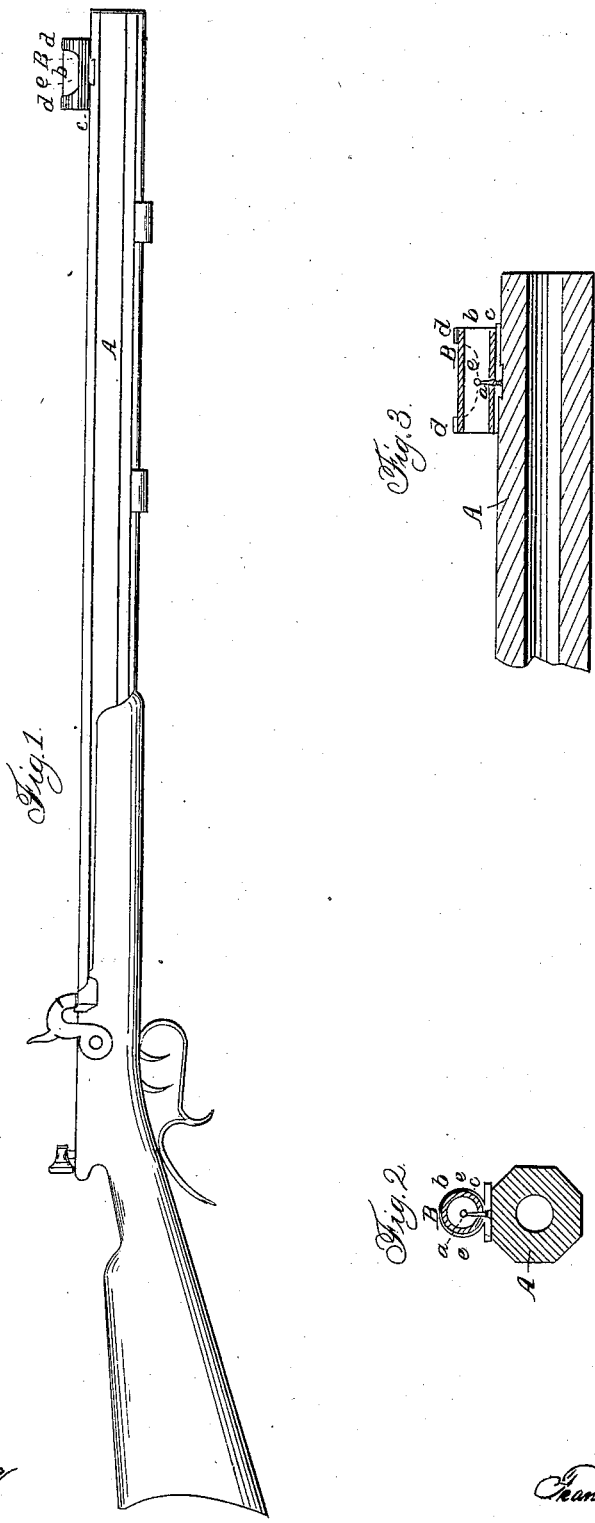

UNITED STATES PATENT OFFICE.

FRANK N. MARTIN, OF COVINGTON, KENTUCKY.

IMPROVEMENT IN GUN-SIGHTS.

Specification forming part of Letters Patent No. 41,162, dated January 5, 1864.

*To all whom it may concern:*

Be it known that I, FRANK N. MARTIN, of Covington, in the county of Kenton, in the State of Kentucky, have invented a new and original Cover for Gun-Sights; and I do hereby declare that the following is a clear and exact description thereof, reference being had to the accompanying drawings, and to the letters of reference marked thereon.

My invention relates to the cover or protecting-sheath for gun-sights, constructed wholly or in part of a transparent material, which shall permit the light to completely illuminate the "sight."

To enable others to fully understand the nature and object of my invention, I will proceed to describe its construction and application.

Figure 1 of the accompanying drawings is an elevation of a gun having my improvement attached. Fig. 2 is a transverse section of my improved cover. Fig. 3 is a longitudinal sectional view of the same.

A is the gun-barrel, to which is attached, upon its upper surface and near the muzzle, the cylindrical cover B for the sight $a$. The sight $a$ is attached to the frame $c$ in the usual manner. The frame $c$, which for convenience is cylindrical in form, is open on the top between the ribs $d\,d$ and on the sides to the points $e\,e$. Previous to the adjustment of the sight $a$, an open cylinder, $b$, made of glass or other transparent material, is introduced into the frame $c$. A suitable packing is introduced between the cylinder $b$ and those parts of the frame $c$ in contact with it.

The covers for sights as now constructed shut out much of the light—a serious difficulty, since in confined, naturally dark places, or where the light is feeble, the sight cannot be distinguished. I overcome the difficulty by constructing a transparent cover protected by a light metallic frame, which is attached to the barrel of the gun in the usual manner. The ordinary cylindrical covers, admitting light only at the ends, shut out the rays from the top and sides, making the interior of the covers quite dark.

In order more effectually to utilize the light which enters the cylindrical cover, the "packing" is composed of such material as will reflect the rays, thus illuminating the sight over its entire surface. The packing should be composed of soft or elastic material, in order to protect the "open transparent cylinder" from fracture in case of sudden jarring.

My improvement is particularly applicable when the "globe sight" is used, in which case pure gold, which does not readily tarnish, is much to be preferred to the baser metals, which possess less reflective properties.

Having fully described my invention and clearly set forth its advantages, I will state what I claim as new and original and desire to secure by Letters Patent:

The open cylinder $b$, or its equivalent, made of suitable transparent material, for the purpose above specified.

FRANK N. MARTIN.

Witnesses:
ADOLPHE H. BOCKING,
U. P. JAMES.